United States Patent
Rhee et al.

(10) Patent No.: US 7,783,853 B1
(45) Date of Patent: Aug. 24, 2010

(54) MEMORY USAGE TECHNIQUES IN MIDDLEWARE OF A REAL-TIME DATA DISTRIBUTION SYSTEM

(75) Inventors: Stephen Jisoo Rhee, Mountain View, CA (US); Yi Dai, Mountain View, CA (US); Gerardo Pardo-Castellote, Palo Alto, CA (US); Rajive Joshi, San Jose, CA (US)

(73) Assignee: Real-Time Innovations, Inc., Santa Clara, CA (US)

( * ) Notice: Subject to any disclaimer, the term of this patent is extended or adjusted under 35 U.S.C. 154(b) by 1010 days.

(21) Appl. No.: 11/379,986

(22) Filed: Apr. 24, 2006

(51) Int. Cl.
*G06F 12/12* (2006.01)
*G06F 15/167* (2006.01)

(52) U.S. Cl. .................... 711/170; 709/214
(58) Field of Classification Search ............ 711/170; 709/214
See application file for complete search history.

(56) References Cited

U.S. PATENT DOCUMENTS

| | | | |
|---|---|---|---|
| 4,484,294 A | 11/1984 | Noss | |
| 4,568,866 A | 2/1986 | Floro et al. | |
| 4,796,179 A | 1/1989 | Lehman et al. | |
| 5,055,755 A | 10/1991 | Ozawa et al. | |
| 5,086,385 A | 2/1992 | Launey et al. | |
| 5,404,288 A | 4/1995 | McDunn | |
| 5,546,301 A | 8/1996 | Agrawal et al. | |
| 5,668,998 A | 9/1997 | Mason et al. | |
| 5,838,563 A | 11/1998 | Dove et al. | |
| 5,940,827 A | 8/1999 | Hapner et al. | |
| 5,971,581 A | 10/1999 | Gretta et al. | |
| 6,026,352 A | 2/2000 | Burns et al. | |
| 6,058,445 A | 5/2000 | Chari et al. | |
| 6,076,952 A | 6/2000 | Gretta et al. | |
| 6,101,419 A | 8/2000 | Kennedy et al. | |
| 6,106,569 A | 8/2000 | Bohrer et al. | |
| 6,119,125 A | 9/2000 | Gloudeman et al. | |
| 6,134,706 A | 10/2000 | Carey et al. | |
| 6,154,680 A | 11/2000 | White et al. | |
| 6,195,591 B1 | 2/2001 | Nixon et al. | |
| 6,219,772 B1 * | 4/2001 | Gadangi et al. | ............. 711/170 |

(Continued)

OTHER PUBLICATIONS

U.S. Appl. No. 11/410,563, filed Apr. 24, 2006.

(Continued)

*Primary Examiner*—Shane M Thomas
(74) *Attorney, Agent, or Firm*—Beyer Law Group LLP

(57) ABSTRACT

A method of operating real-time middleware associated with at least one node of a data distribution system is provided. At least one pool of a plurality of fixed block size units of memory of the node is allocated (e.g., via an operating system call). Based on loan requests for dynamic memory elements on behalf of a user application executing on the node, an indication of at least one of the allocated fixed block size units to be lent is provided. A list of which allocated fixed block size units are being lent from the pool is maintained, including maintaining the list based on return requests, on behalf of the user application executing on the node, of fixed block size units of the pool. Substantially all of the dynamic memory elements of the real-time middleware associated with the node are provided from the at least one pool of allocated fixed block size units based on the loan requests on behalf of the user application.

36 Claims, 10 Drawing Sheets

U.S. PATENT DOCUMENTS

| | | | |
|---|---|---|---|
| 6,226,788 | B1 | 5/2001 | Schoening et al. |
| 6,226,792 | B1 | 5/2001 | Goiffon et al. |
| 6,259,958 | B1 | 7/2001 | Steinman et al. |
| 6,269,396 | B1 | 7/2001 | Shah et al. |
| 6,425,119 | B1 | 7/2002 | Jones et al. |
| 6,477,439 | B1 | 11/2002 | Bernaden, III et al. |
| 6,493,740 | B1 | 12/2002 | Lomax |
| 6,725,446 | B1 | 4/2004 | Hahn et al. |
| 6,751,663 | B1 | 6/2004 | Farrell et al. |
| 6,779,084 | B2 * | 8/2004 | Wolrich et al. ............... 711/118 |
| 7,089,328 | B1 * | 8/2006 | O'Rourke et al. ........... 709/245 |
| 7,117,245 | B1 | 10/2006 | Levkoff et al. |
| 7,123,142 | B2 | 10/2006 | Bohbot et al. |
| 7,353,279 | B2 | 4/2008 | Curvasula et al. |
| 7,424,549 | B2 | 9/2008 | Beckwith |
| 2002/0013889 | A1 * | 1/2002 | Schuster et al. ............. 711/203 |
| 2002/0101860 | A1 | 8/2002 | Thornton et al. |
| 2003/0005117 | A1 | 1/2003 | Kang et al. |
| 2003/0037177 | A1 | 2/2003 | Sutton et al. |
| 2003/0105800 | A1 | 6/2003 | Cullen |
| 2003/0135644 | A1 | 7/2003 | Barrett |
| 2003/0195959 | A1 | 10/2003 | Labadie et al. |
| 2003/0200315 | A1 | 10/2003 | Goldenberg et al. |
| 2003/0229786 | A1 | 12/2003 | Hollis et al. |
| 2003/0229900 | A1 | 12/2003 | Reisman |
| 2004/0024943 | A1 | 2/2004 | Lupien et al. |
| 2004/0059819 | A1 | 3/2004 | Hardcastle |
| 2004/0064553 | A1 | 4/2004 | Kjellberg |
| 2004/0205206 | A1 | 10/2004 | Naik et al. |
| 2005/0049934 | A1 | 3/2005 | Nakayama et al. |
| 2005/0053060 | A1 | 3/2005 | Pettey |
| 2005/0218739 | A1 | 10/2005 | Maddin et al. |
| 2006/0002388 | A1 | 1/2006 | Grebus et al. |
| 2006/0095765 | A1 | 5/2006 | Pessach |
| 2006/0133313 | A1 | 6/2006 | You et al. |
| 2006/0251055 | A1 | 11/2006 | Monette et al. |
| 2007/0016637 | A1 | 1/2007 | Brawn et al. |

OTHER PUBLICATIONS

U.S. Appl. No. 11/410,511, filed Apr. 24, 2006.
Taylor, Object-Oriented Information Systems Planning and Implementation, pp. 1-172, 215-282, Apr. 10, 1992.
Rational Rose, Using Rational Rose 4.0, Rational Software Corporation, pp. 1-219, Nov. 1996.
Quatrani, Terry,Visual Modeling with Rational Rose and UML, pp. 1-6, Third Printing Apr. 1998.
Object Management Group (OMG), "Data Distribution Service for Real-Time Systems Specification," Version 1.1, Dec. 2005.
Case et al., A Simple Network Management Protocol (SNMP), May 1990, IETF, RFC 1157, pp. 2, 6-8, 10, 12, 16, 19-20, 25, 27.
McCloghrie et al., Management Information Base for Network Management of TCP/IP-based internets, Aug. 1988, IETF, RFC 1066, pp. 10-11.
Rose et al., Structure and Identification of Management Information for TCP/IP-based internets, Aug. 1988, IETF, RFC 1065, pp. 7-8, 10.
Information Sciences Institute, USC, Internet Protocol, Sep. 1981, IETF, RFC 791, pp. 11.
Postel, J., User Datagram Protocol, Aug. 28, 1980, IETF, RFC 768, pp. 1.
UML Booch & Omt, Quick Reference for Rational Rose 4.0, 1996, Rational Software Corporation, pp. 10.
Burnett et al., "Concepts and Environments—Visual Object-Oriented Programming", 1995, Manning Publications Co., pp. 276.
Firesmith et al., "Dictionary of Object Technology", Sigs Books, 1995, pp. 5.
Castellote et al., "NDDA: The Real-Time Publish-Subscribe Middleware," Proceedings of the IEEE Real-Time Systems Symposium, 1997, 11 pages.
Castellote et al., "The Network Data Delivery Service: Real-Time Data Connectivity for Distributed Control Applications," Proceedings of the International Conference on Robotics and Automation, IEEE, May 1994, 7 pages.
Office Action dated Mar. 17, 2010 from U.S. Appl. No. 11/410,511.
Office Action dated May 20, 2005 from U.S. Appl. No. 10/118,470.
Final Office Action dated Nov. 15, 2005 from U.S. Appl. No. 10/118,470.
Office Action dated Sep. 15, 2006 from U.S. Appl. No. 10/118,470.
Final Office Action dated Apr. 4, 2007 from U.S. Appl. No. 10/118,470.
Office Action dated Jul. 21, 2008 from U.S. Appl. No. 10/118,470.
Final Office Action dated Aug. 20, 2009 from U.S. Appl. No. 10/118,470.
Office Action dated May 26, 2010 from U.S. Appl. No. 10/118,470.
Notice of Allowance dated May 26, 2010 from U.S. Appl. No. 11/410,563.

* cited by examiner

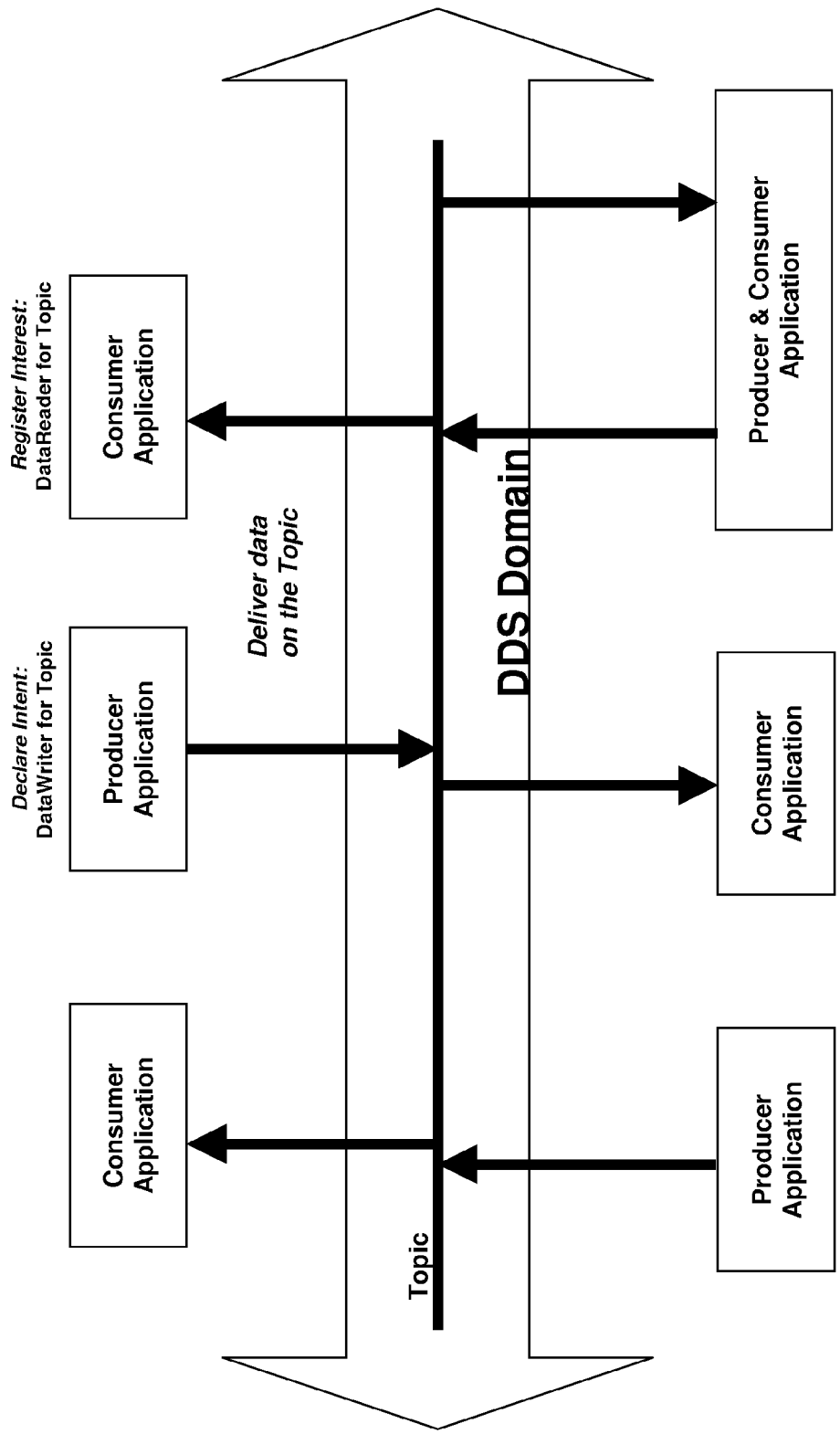

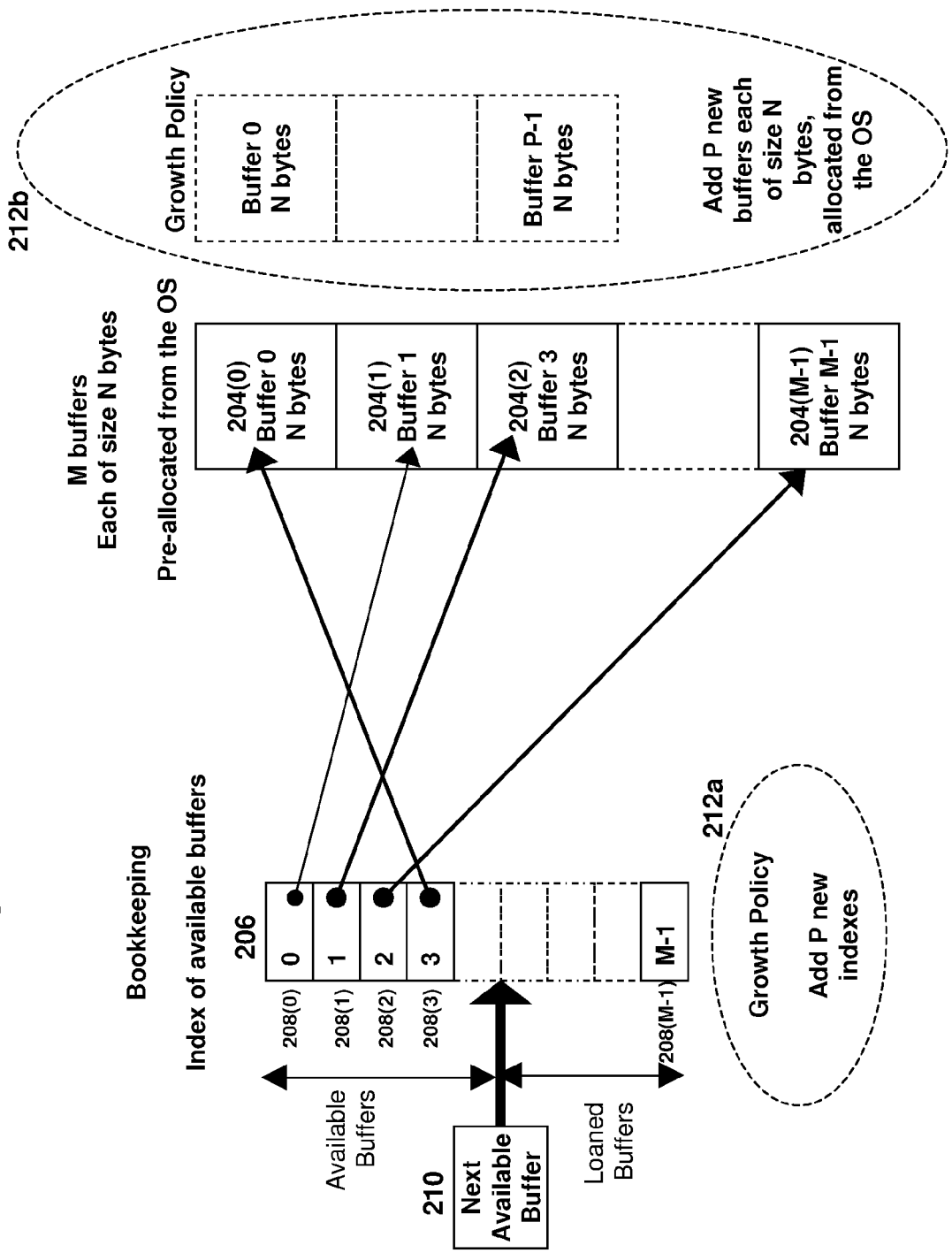
Fig. 2: FastBuffer: M, N, P

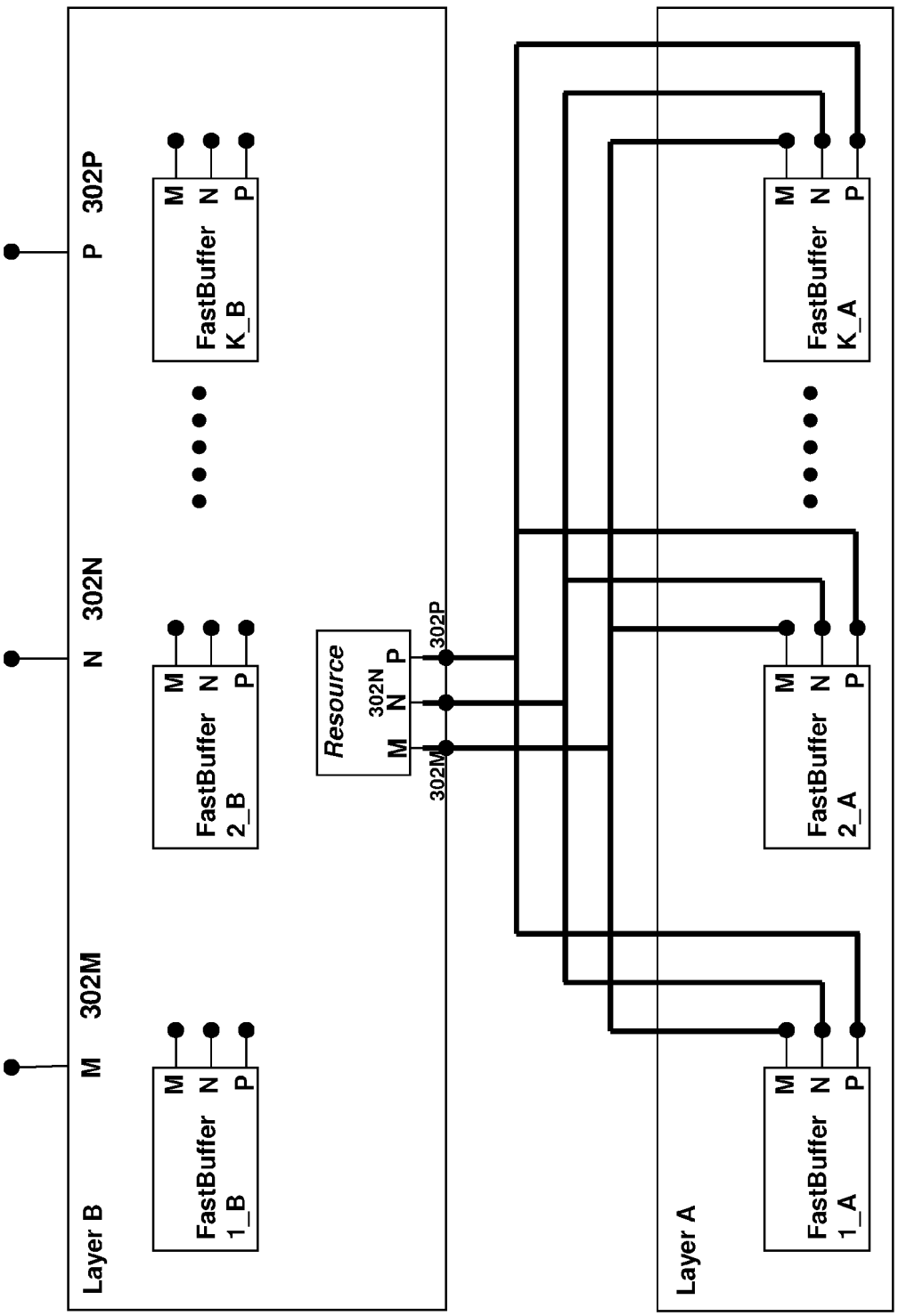
Fig. 3: FastBuffer Parameters are mapped parametrically to layers above

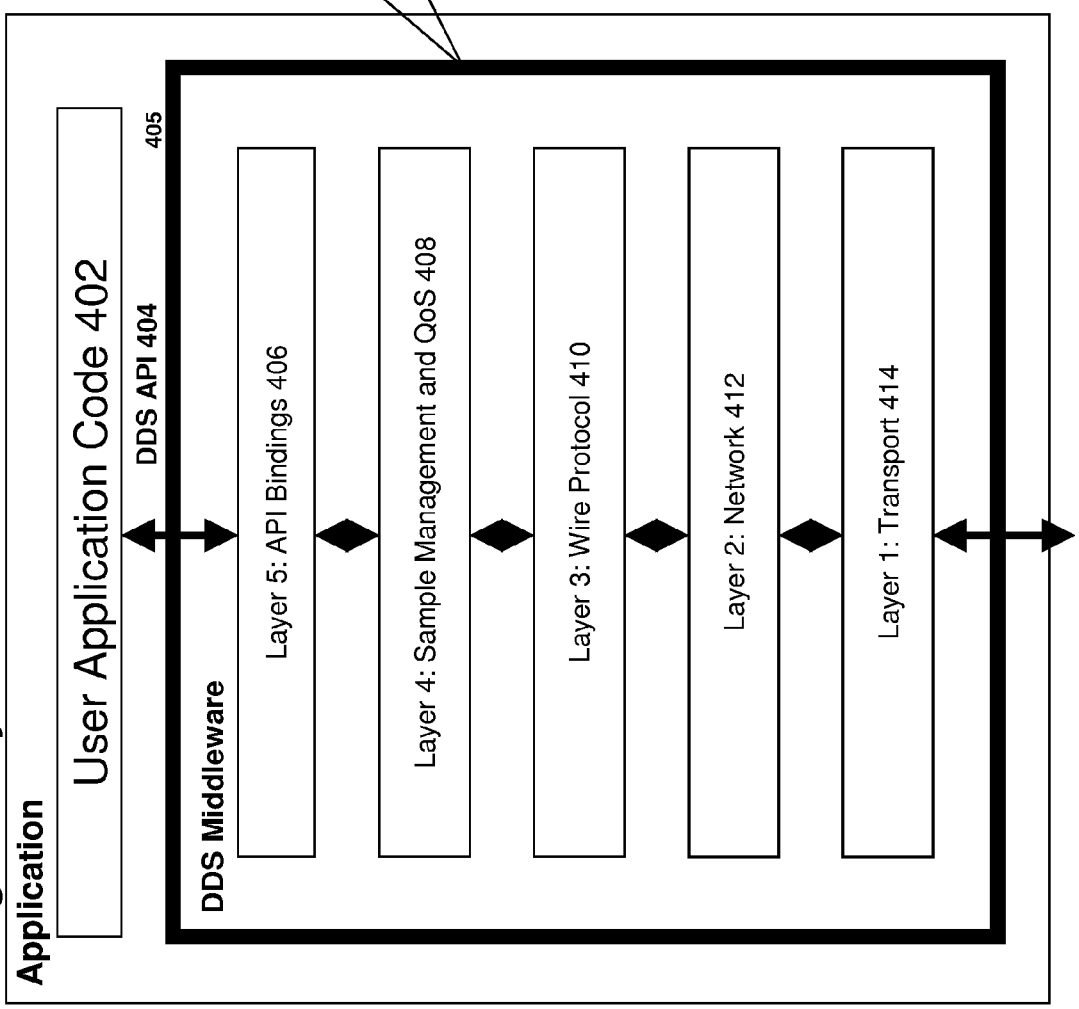
Fig. 4: Layered DDS Middleware Architecture

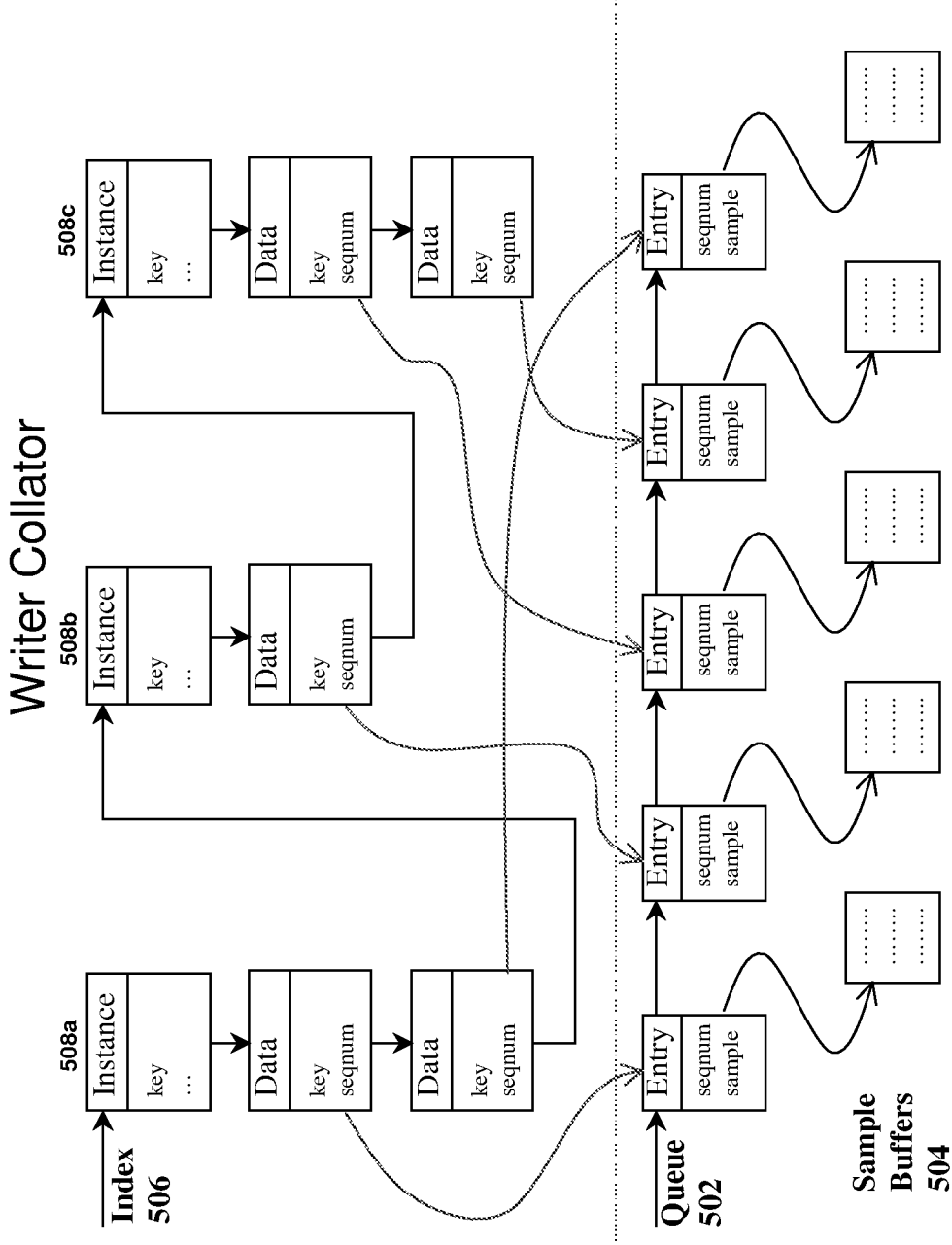

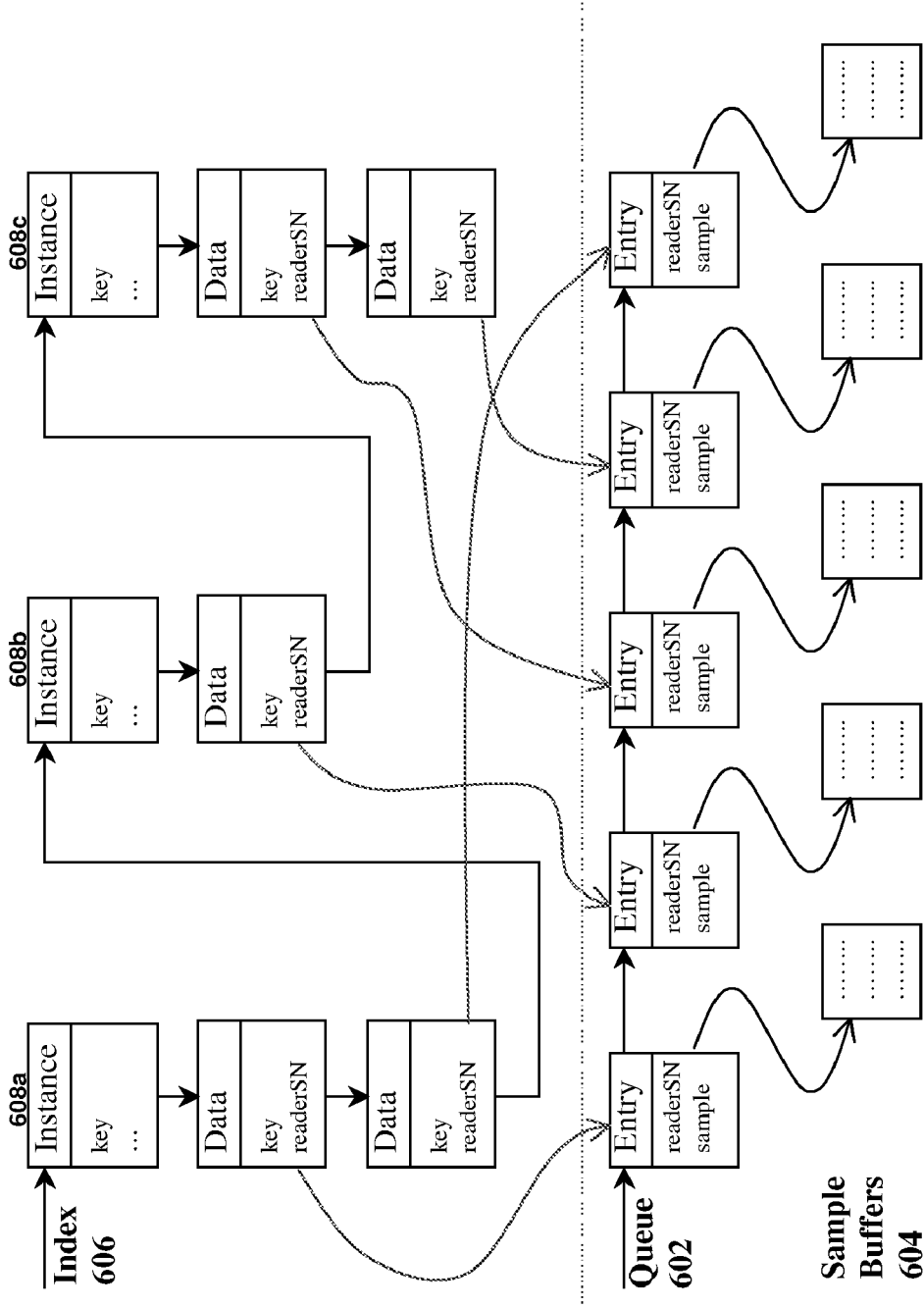
Fig. 6: Incoming Data Buffering
Reader Collator: Queue and Index

Fig. 7: Incoming Data Buffering
Reader Collator: Remote Writer Queue
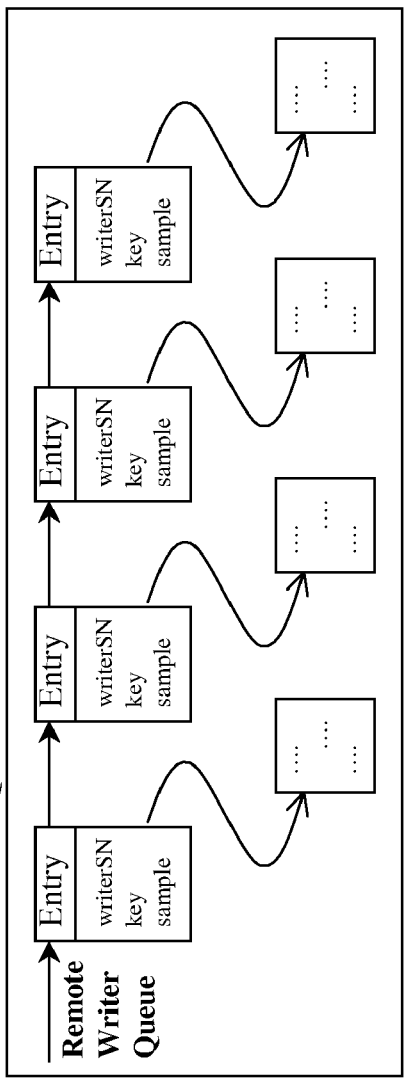
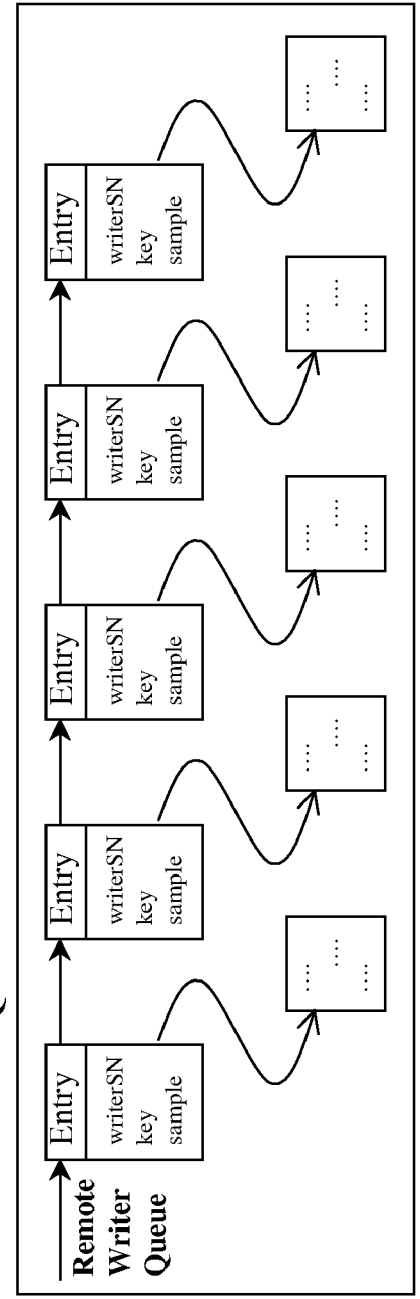

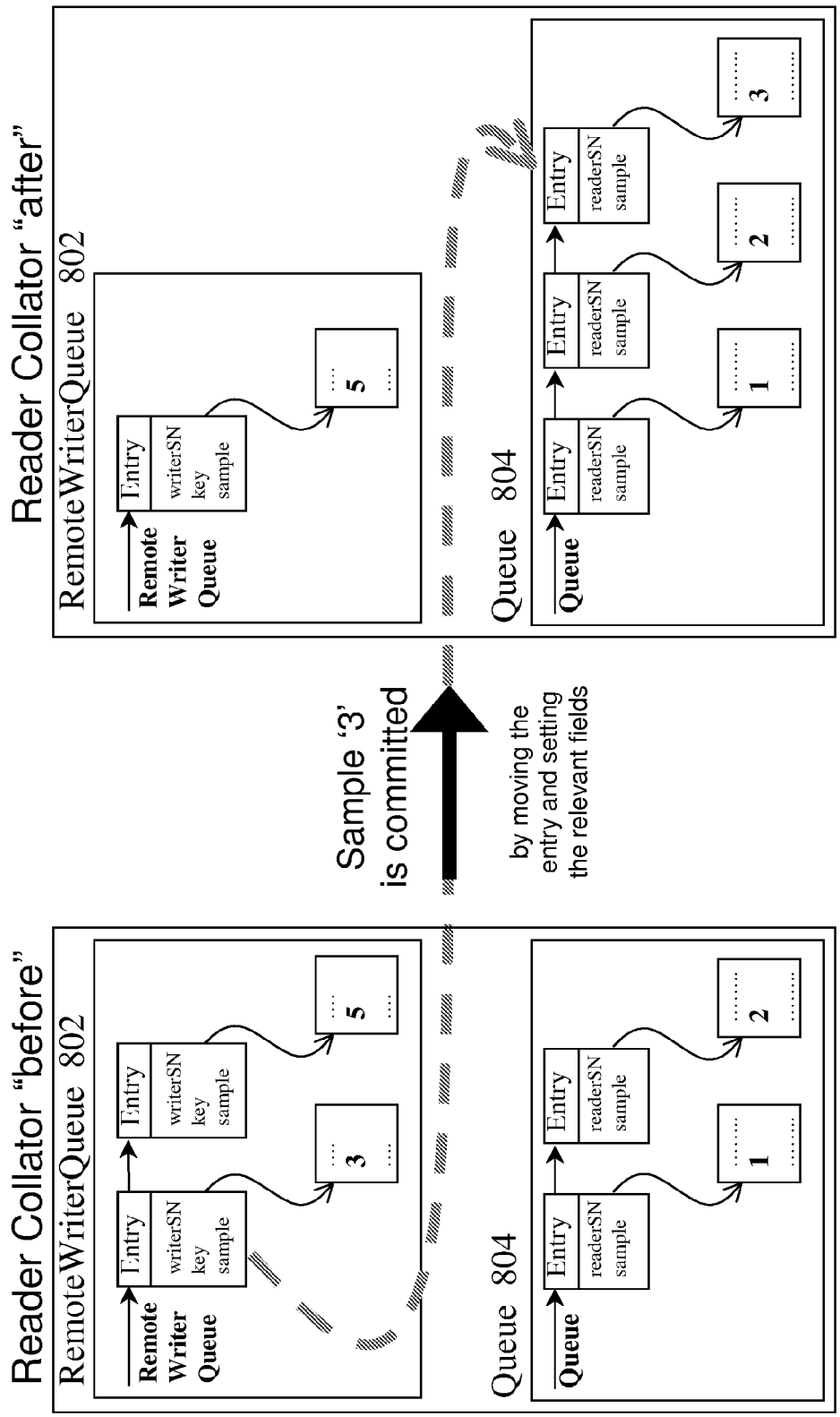

US 7,783,853 B1

MEMORY USAGE TECHNIQUES IN MIDDLEWARE OF A REAL-TIME DATA DISTRIBUTION SYSTEM

CROSS-REFERENCE TO RELATED APPLICATIONS

This application is related to co-pending and concurrently filed application Ser. No. 11/410,563, filed Apr. 24, 2006, entitled "A FRAMEWORK FOR EXECUTING MULTIPLE THREADS AND SHARING RESOURCES IN A MULTI-THREADED COMPUTER PROGRAMMING ENVIRONMENT", by Stephen Jisoo Rhee, Elaine Yee Ting Sin, Gerardo Pardo-Castellote, Stefaan Sonck Thiebaut, and Rajive Joshi, which is incorporated by reference herein for all purposes.

This application is related to co-pending and concurrently filed application Ser. No. 11/410,511, filed Apr. 24, 2006, entitled "FLEXIBLE MECHANISM FOR IMPLEMENTING THE MIDDLEWARE OF A DATA DISTRIBUTION SYSTEM OVER MULTIPLE TRANSPORT NETWORKS", by Rajive Joshi, Henry Choi, and Gerardo Pardo-Castellote, and Stefaan Sonck Thiebaut, which is incorporated by reference herein for all purposes.

BACKGROUND

Middleware may be used to implement a real-time data distribution system to allow distributed processes to exchange data without concern for the actual physical location or architecture of their peers. The middleware may include support for best-effort and reliable communications. For example, the Object Management Group's (OMG) Data Distribution Service for Real-Time Systems (DDS) is a standard specification for publish-subscribe data-distribution systems. The purpose of the specification is to provide a common application-level interface that clearly defines the data-distribution service.

Referring to the simplified block diagram in FIG. 1, DDS uses a publish-subscribe (P-S) communication model. The P-S communication model employs asynchronous message passing between concurrently operating subsystems. The publish-subscribe model connects anonymous information producers with information consumers. The overall distributed system is composed of processes, each running in a separate address space possibly on different computers. In this patent application, each of these processes of the distributed system is referred to as a "participant application". A participant application may be a producer or consumer of data, or both.

Using the middleware, data producers declare the topics on which they intend to publish data; data consumers subscribe to the topics of interest. When a data producer publishes some data on a topic, the middleware operates such that all the consumers subscribing to that topic receive it. The data producers and consumers remain anonymous, resulting in a loose coupling of sub-systems, which is well suited for data-centric distributed applications. This is referred to as a DCPS (data-centric publish subscribe) architecture.

The DCPS model employs the concept of a "global data space" of data-objects that any entity can access. Applications that need data from this space declare that they want to subscribe to the data, and applications that want to modify data in the space declare that they want to publish the data. A data-object in the space is uniquely identified by its keys and topic, and each topic has a specific type. There may be several topics of a given type. A global data space is identified by its domain id. Each subscription/publication belongs to the same domain to communicate.

For example, the reader is referred to the Object Management Group's Specification entitled "Data Distribution Service for Real-Time Systems Specification,"Version 1.1, dated December 2005. See http: //www dot omg dot org/docs/formal/05-12-04 dot pdf (referred to herein as "DDS Specification"). In the DDS Specification, a DCPS architecture is specified that includes the following entities: DomainParticipant, DataWriter, DataReader, Publisher, Subscriber, and Topic. All these classes extend Entity, which is an abstract base class for all the DCPS objects that support QoS policies, a listener and a status condition. The particular extension of Entity represents the ability to be configured through QoS policies, be enabled, be notified of events via listener objects, and support conditions that can be waited upon by the application. Each specialization of the Entity base class has a corresponding specialized listener and a set of QoSPolicy values that are suitable to it. See FIGS. 2-2 ("DCPS conceptual model") of the DDS Specification.

A Publisher represents the object responsible for data issuance. A Publisher may publish data of different data types. A DataWriter is a typed facade to a publisher; participants use DataWriter(s) to communicate the value of and changes to data of a given type. Once new data values have been communicated to the publisher, it is the Publisher's responsibility to determine when it is appropriate to issue the corresponding message and to actually perform the issuance (the Publisher will do this according to its QoS, or the QoS attached to the corresponding DataWriter, and/or its internal state).

A Subscriber receives published data and makes it available to the participant. A Subscriber may receive and dispatch data of different specified types. To access the received data, the participant must use a typed DataReader attached to the subscriber.

The association of a DataWriter object (representing a publication) with DataReader objects (representing the subscriptions) is done by means of the Topic. A Topic associates a name (unique in the system), a data type, and QoS related to the data itself. The type definition provides enough information for the service to manipulate the data (for example serialize it into a network-format for transmission). The definition can be done by means of a textual language (e.g. something like "float x; float y;") or by means of an operational "plugin" that provides the necessary methods.

The DDS middleware handles the actual distribution of data on behalf of a user application. The distribution of the data is controlled by user settable Quality of Service (QoS).

Real-time middleware should be characterized by predictable delivery of data. The middleware of a node thus buffers incoming data samples until an application executing on the node retrieves the data samples. In addition, the middleware buffers outgoing data samples, for example, in case they need to be resent to one or more readers according to an applicable QoS. Storing data samples requires memory, and the amount needed changes dynamically.

SUMMARY

In accordance with an aspect, a method of operating real-time middleware associated with at least one node of a data distribution system is provided. At least one pool of a plurality of fixed block size units of memory of the node is allocated (e.g., via an operating system call). Based on loan requests for dynamic memory elements on behalf of a user application executing on the node, an indication of at least one of the allocated fixed block size units to be lent is provided. A list of which allocated fixed block size units are being lent from the pool is maintained, including maintaining the list based on return requests, on behalf of the user application executing on the node, of fixed block size units of the pool. Substantially all of the dynamic memory elements of the real-time middleware associated with the node are provided from the at least one pool of allocated fixed block size units based on the loan requests on behalf of the user application.

In accordance with another aspect, a method of communicating data samples by middleware associated with at least one node of a data distribution system is provided. The method includes storing the data samples in memory of the node in fixed block size units. A list is maintained in memory of the node in fixed block size units, each entry in the list corresponding to a separate one of the data samples. An index data structure is maintained including a plurality of instance lists, in memory of the node in fixed block size units, each instance list corresponding to a separate data-object instance within the node and each entry of each instance list corresponding to a data sample for the data-object instance to which that instance list corresponds. The memory of fixed block size units is borrowed and returned, as appropriate, to at least one memory buffer pool associated with the node.

BRIEF DESCRIPTION OF THE DRAWINGS

FIG. 1 is a simplified block diagram illustrating a DDS publish-subscribe (P-S) middleware communication model.

FIG. 2 illustrates a FastBuffer scheme for allocating, lending and returning fixed-size memory blocks.

FIG. 3 illustrates a general methodology for using the FastBuffer scheme in a real-time middleware implementation.

FIG. 4 is a block architecture diagram of a middleware implementation that is configured in layers.

FIG. 5 illustrates an architecture to handle outgoing data samples in the real-time middleware in accordance with the FastBuffer scheme.

FIG. 6 illustrates an architecture to handle incoming data samples in the real-time middleware in accordance with the FastBuffer scheme.

FIG. 7 illustrates an example of using an additional level of buffer management for handling incoming data samples.

FIG. 8 illustrates an example of committing a sample to the Reader Collator's Queue 602.

DETAILED DESCRIPTION

Figure 9A:
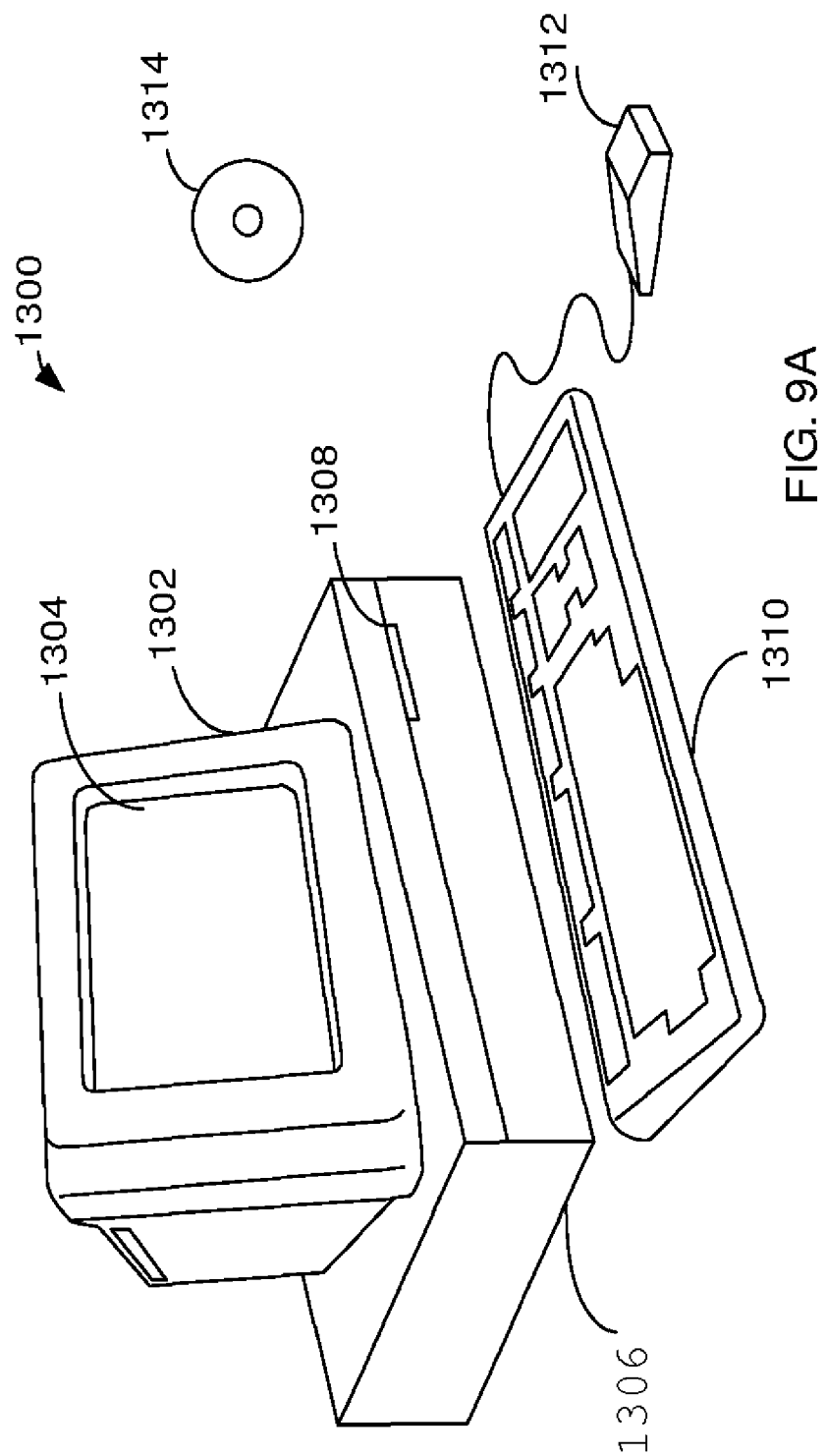
FIGS. 9A-B illustrate a computer system, which is suitable for implementing the embodiments described herein.

It is desired to minimize or avoid memory operations that can affect the timeliness of data delivery in a real-time data distribution system. Typically, memory is allocated dynamically by an operating system. In general, not only is dynamic allocation/deallocation of memory an expensive operation, but it also takes a varying (i.e., unpredictable) amount of time. Also, dynamic memory allocation/deallocation can result in memory fragmentation, such that the available contiguous memory is less than a certain size, which can exhaust memory for larger size blocks even though there is enough total memory available. These characteristics detract from real-time operation.

In accordance with an aspect, the middleware acts such that it is allocated large blocks of memory, and the middleware controls the use of that allocated memory by threads of the middleware, such that the allocated memory can be used in a predictable way. More particularly, the middleware "lends" fixed-size blocks of the allocated memory to the threads. The thread then "returns" the lent fixed-size blocks at a later time as appropriate. For example, if a fixed-size block holds a sample to be published, the fixed-size block may be returned when all consumers acknowledge receipt of the sample, if the quality of service policy attached to the publication requires reliable publication. As another example, the fixed-size block holding a sample to be published may be returned upon publication of the sample (without regard for acknowledgement of receipt) if the quality of service policy attached to the publication is best-effort.

In summary, a predictable memory management scheme and architecture is described including one or more of the following elements. First, a fast memory manager for fixed size buffers (referred to as a "FastBuffer") is described. Also described is an organization of all the dynamic memory in the middleware as fixed size memory blocks that can be managed as separate FastBuffers. For example, the use of FastBuffers for all user data and samples is described. A particular implementation is described as well, namely a data structure and algorithms for sample management that is organized around the FastBuffer scheme.

Turning now to FIG. 2, the FastBuffer scheme for allocating, lending and returning fixed-size memory blocks is described. A FastBuffer 200 includes a pool 202 of fixed size memory buffers 204. The pool 202 is comprised of the large block of allocated memory. The FastBuffer 200 maintains an array 206 of buffer pointers 208, each capable of holding a pointer to one of the fixed size memory buffers of the pool 202, a counter of how many buffers are available, and a moving 'pointer' 210 to the next available buffer in the pool.

When a FastBuffer 200 is created, the array 206 of buffer pointers 208 is filled up so that each member of the array 206 points to an available buffer 204 in the pool. At runtime, one or more buffers 204 can be requested by a thread of the middleware. The requested buffer 204 is loaned to the thread and, when the thread is finished using the borrowed buffer 204, that buffer 204 is returned back to the FastBuffer 200.

When the FastBuffer 200 loans a buffer to a thread, the internal moving pointer 210 to the array 206 of buffer pointers 208 is decremented, and the next available buffer 204 (as indicated by the particular buffer point 208 pointed to by the internal moving pointer 210) is lent to the requesting thread. When the thread returns the lent buffer 204 back to the FastBuffer 200, that buffer 204 becomes the next available buffer 204 to be lent, and the internal moving pointer 210 to the array of buffers 202 is incremented and the returned buffer 204 is added to the array 206 of buffer pointers.

Thus, chunks of memory can be allocated/deallocated in constant time, without involvement of unpredictable operating system. In general, a FastBuffer 200 is characterized by three parameters—M, N and P. M indicates the number of initial buffers 204 in the buffer pool 202. N indicates the size in bytes of each buffer 204. Finally, P is an indication of the growth policy associated with the buffer pool 202. That is, P indicates how many additional N-byte size buffers 204 should be allocated when required. The FastBuffer scheme includes detecting when a predetermined condition is met—i.e., when additional buffers 204 are to be allocated. This may be, for example, when the number of available (i.e., not lent) buffers 204 goes down to a threshold number (which may even be zero).

A growth policy (denoted by reference numerals 212*a* and 212*b*) can be specified with the FastBuffer scheme, to specify how the pool of available buffers should be expanded when all the buffers are on loan and additional buffers are desired by the users. Additional 'P' buffers (212b) can be added to the pool 202 by allocating P*N bytes from the operating-system (OS), as well as adding P new pointers 208 to the array 206 of buffer pointers.

'P' can be specified in a variety of ways including, for example:

- P=0, i.e. a no growth policy. When all the buffers are exhausted the caller will see an 'out of resources' condition.
- P=fixed number, i.e. a linear growth policy. A fixed number of buffers are injected into the pool when it is exhausted (or the requirement for new buffers is otherwise met, as discussed above)
- P=current number of buffers, i.e. exponential growth policy. The pool is doubled when it is exhausted (or the requirement for new buffers is otherwise met, as discussed above)

Having described an example of the FastBuffer scheme, we now discuss generally how real-time tasks can use the FastBuffer scheme to access memory quickly and in a predictable manner. As discussed above, the normal memory-allocation routines (such as malloc and free) are relatively slow routines and may be too time-consuming for real-time tasks. Furthermore, the time for these routines is not predictable. By using the FastBuffer scheme, real-time tasks can access memory quickly.

In one example, to use the FastBuffer scheme, the FastBufferPool_new routine is called (typically during initialization). This will pre-allocate a specified number (M) of buffers, each of a specified size (N bytes) from the OS. At run time, a task can borrow a buffer by calling FastBufferPool_getBuffer. The caller can use the buffer for its purposes for as long as necessary and then return the buffer by calling FastBufferPool_returnBuffer. If, when using getBuffer, the FastBufferPool runs out of buffers, it will allocate a block of additional buffers from the OS. The number of additional buffers that will be allocated is user configurable via a growth policy. FastBufferPool_returnBuffer will cause the buffer to the FastBufferPool but will not dynamically return memory to the OS. The getBuffer( ) and the returnBuffer( ) routines operate quickly and in constant time (for getBuffer( ) if no growth was necessary or allowed), thus making the memory allocation/deallocation fast and predictable from the perspective of the caller.

Some example C code is set forth below:

```
struct: FastBufferPool *pool;
typedef struct {
...
} *myType, myTypeStorage;
int initialize (void)
{
    pool=FastBufferPool_newForStructure (100, 10000, myTypeStorage);
    ...
}
void task (void)
{
    myType var1, var2;
    ...
    var1=FastBufferPool_getBuffer (pool);
    var2=FastBufferPool_getBuffer (pool);
    ...
    FastBufferPool_returnBuffer (var1);
    FastBufferPool_returnBuffer (var2);
    ...
}
```

With reference to FIG. 3, we now describe a general methodology for using the FastBuffer scheme in a real-time middleware implementation. (Later, we describe a particular application of this general methodology, to sample handling.) An efficient and predictable real-time middleware implementation can be realized by using the FastBuffer scheme for all dynamic memory data structures. A real-time middleware implementation may be developed in layers. Some organizing principles for using the FastBuffer methodology, in one example, for a real-time middleware implementation are now discussed. It should be noted that, while these are discussed as organizing principles, they should not be viewed as limiting the invention as set forth in the claims.

One principle is that substantially all of the internal dynamic memory data structures used by the middleware have a fixed block size. The middleware uses only multiples of the fixed size data structures—no variable-sized data structures.

Another principle is that each dynamic memory data structure is associated with its own FastBuffer. When new instances of the data structure are needed, the new instances are obtained from the FastBuffer pool. When the instances are no longer needed, the instances are returned back to the FastBuffer pool.

Another principle, illustrated in FIG. 3, is that multiple FastBuffer parameters are mapped parametrically to define a data structure such that not all of the resource parameters need be explicitly defined (either by a user application, or by a default). Rather, a set of resource parameters may be parametrically defined based on another set of resource parameters that is explicitly defined or may even have been itself parametrically defined.

This parametric definition of resource parameters may be particularly useful in conjunction with a middleware implementation that is configured in layers, such as that shown in the FIG. 4 block architecture diagram. In this way, multiple FastBuffer parameters in a lower layer can be parametrically defined as a function of resource parameters at a higher layer, and the data structure can be exposed to the user application by means of memory usage Quality of Service (QoS) policies 407. The hierarchical mapping scheme addresses what might otherwise be an explosion in FastBuffer parameters and an ensuing configuration complexity for the user. Rather, the user application code need only consider a relatively small set of well-understood configuration policies.

Using the FIG. 4 example, the user application code 402 may only provide FastBuffer configuration parameters to the Middleware 405 via the Middleware API 404. For example, the Middleware API may include the OMG DDS API specification for real-time data distribution. FastBuffer configuration parameters for use in lower layers (e.g., any of layers 406, 408, 410, 412 and 414) of the Middleware may be defined parametrically based directly or indirectly on the configuration parameters provided from the user application code 402. Typically, the layers are organized hierarchically and have well-defined interfaces between them, such that configuration parameters provided from one layer to another layer are provided through any intervening layers via those well-defined interfaces.

Referring to FIG. 3, generically, the user application configures the parameters M, N and P (denoted by 302M, 302N and 302P—generally, 302) at the interface to Layer B. Within the definition of Layer B, the resource parameters M, N and P for FastBuffer 1_B are internally defined (e.g., are fixed to a default value, or are parametrically defined as a function of the parameters M, N and P 302 provided by the user application at the interface to Layer B) and need not be configured by the user application. In fact, the resource parameters M, N and P for FastBuffer 1_B are typically not even accessible to the user application. Similarly, the resource parameters M, N and P for FastBuffer 2_B and up to FastBuffer K_B are internally defined.

In addition, the resource parameters M, N and P (304M, 304N and 304P—generally, 304) are provided from Layer B to Layer A at the interface between Layer B and Layer A. These resource parameters 304 are internally defined within Layer B and provided to Layer A. The resource parameters M, N and P for FastBuffer 1_A to FastBuffer K_A are provided in a manner similar to that discussed above with respect to the resource parameters M, N and P for FastBuffer 1_B to FastBuffer K_B. While FIGS. 3 and 4 illustrate parametric definition of parameters across layers, such parametric definition need not be across layers and, for example, may be within a particular layer as well.

Using this organizational technique can have benefits that can be critical to real-time middleware implementation. For example, the middleware can pre-allocate all the dynamic memory it is going to need during its operation. A user can limit the dynamic memory usage to predetermined amounts, which can be especially useful in resource constrained environments. Furthermore, the middleware dynamic memory usage can be configured by the user to follow a well-defined growth policy. The memory already in use continues to be used, while additional memory can be added for use by the middleware as needed to support the user application code.

It can also be seen that middleware implementation that use the FastBuffer implementation do not depend on any platform-specific memory management scheme. This allows the middleware code to be easily ported, even to environments that may not support dynamic memory in the OS.

We now discuss a particular example of middleware implementation using the FastBuffer scheme for sample management. As discussed above, samples are the data items distributed in a DCPS (data-centric publish subscribe) architecture. In general, data samples are stored in internal buffers, by the middleware on behalf of a user publisher application, to realize a particular quality of service (QoS), for example, as requested or assumed by the user publisher application. Furthermore, samples are stored in internal buffers, by the middleware, on behalf of a user consumer application until the user consumer application can actually consume the samples. In either case (publisher or consumer), the samples can be purged when they are no longer needed.

More specifically, data samples are stored in FastBuffers, and assigned a sequence number to be used when organized into a list. The list is referred to as a 'Queue' as it largely has queue-like semantics, e.g. first-in first-out. Referring to FIG. 5 as an example, each entry in the Queue 502 points to sample buffers 504 that holds the actual data sample. A sample belongs to exactly one data-object instance, and is accessed by data-object instance for some of the QoS. A separate keyed list is used for this purpose, which is referred to as an 'Index' 506. The Index 506 indexes the samples in the sample buffer 504, referred to by the entries of the Queue 502, in a potentially different order by sorting the samples by instance. Separate data-object instances are referred to in FIG. 5 by reference numerals 508a, 508b and 508c.

Each data-object instance 508 has an associated key, and is also associated with one or more sample entries in the Queue 502. The Index 506 entries and the Queue 502 entries can be allocated from one or more FastBuffer pools that are separate from the FastBuffer pools that are allocated for the data samples (i.e., Sample Buffers 504). It is also possible for the Index 506 entries and the Queue 502 entries to be either distinct entities (i.e., with distinct resource controls M, N and P for each) with one pointing to the other or to be realized by a single entity containing both control structures.

The overall organization illustrated in FIG. 5 is referred to as a 'Writer Collator,' since it supports efficient access to a data sample by the data-object key (i.e. is collated by data-object instance 508 by the Index 506) in addition to by the sample sequence number via the Queue 502. For example, outgoing data samples (in Sample Buffers 504) are organized using a Writer Collator structure where the sample sequence number is assigned in increasing order at write-time (via Queue 502, each entry pointing to a separate sample in Sample Buffers 504), but the samples are collated by instance 508 (via Index 506), as discussed above.

FIG. 6 illustrates the overall organization of an architecture of FastBuffer structures to organize input samples, including collating the input samples by data-object instance. The input samples are held in the Sample Buffers 604, and each entry in a Queue 602 points to a separate one of the Sample Buffers 604. In addition, an Index 606 indexes the samples in the Sample Buffer 604, referred to by the entries of the Queue 602, in a potentially different order by sorting the samples by data-object instance. Separate instances are referred to in FIG. 6 by reference numerals 608a, 608b and 608c.

Referring to FIG. 7, in some examples, there is one more level of buffer management involved for incoming data samples. This helps to manage the incoming communications for reliability considerations. Typically, user applications expect incoming samples to be delivered "in-order." However, in actual practice, the samples may be received by the middleware associated with a consumer application in a different order than the one in which the samples were sent by the middleware associated with a producer application.

Therefore, an additional level of buffer management may include a 'Remote Writer Queue' maintained, in the middleware that includes a Reader, for each 'Remote Writer' from which the Reader receives data samples. For example, FIG. 7 illustrates two Remote Writer Queues 702a and 702b. The potentially out of order incoming samples are inserted into the appropriate Remote Writer Queue 702a or 702b, according to the Remote Writer. That is, the insertion is according to the sequence numbers of the samples provided from the Remote Writer side, which are kept there until missing gaps are filled. As gaps are filled, the samples are moved, or "committed", into the Reader Collator's Queue 602 (FIG. 6), at which time the samples are assigned an increasing sequence number on the Reader's side.

It should be noted that neither the samples nor the entries need be copied; instead the entries from the RemoteWriterQueue can be associated with the Queue 602 by having the physical entry structure contain the control information for associating with either queue (i.e., one or the Remote Writer Queues 702a and 702b, or the Queue 602). Thus, extra memory allocation and copies may be avoided. Use of the queue per remote writer as a staging area can server other purposes as well, such as fragment assembly, coherent change grouping, and suspending and/or resuming updates to the reader.

As with the structure to organize output data samples illustrated in FIG. 5, the various portions of the FIG. 6 structure to organize input data samples may be allocated from various FastBuffer pools. Furthermore, entries in the Remote Writer Queues 702a and 702b may also be allocated from yet different FastBuffer pools from those for the data samples. For each FastBuffer used in the manner just discussed, the parameters of the FastBuffer may be exposed to the application via QosPolicies on a DataReader or DataWriter. Thus the application can control the size of the internal buffers and specify different growth policies as appropriate. As discussed above with reference to FIG. 3, the various FastBuffer pools would typically be organized hierarchically.

We now discuss, with reference to FIG. 8, an example of committing a sample to the Reader Collator's Queue 602. The Remote Writer Queue 802 is an example of a Remote Write Queue such as the Remote Writer Queue 702a or 702b in FIG. 7. At the left side of FIG. 8, the Remote Writer Queue 802 is shown in a "before" state—i.e., before the sample #3 has been committed to the Queue 804 (which is an example of the Queue 602 in FIG. 6). The notation "sample #x" is a shorthand notation to show the order in which the samples were sent from a producer application. That is, "x" is a sequence number of the sample. Since, in the "before" state, sample #1 and sample #2 have already been committed to the Queue 802, sample #3 can be committed to the Queue 802 as well.

At the right side of FIG. 8, the Remote Write Queue 802 is shown an "after" state—i.e., after the sample #3 has been committed to the Queue 804. As can be seen from FIG. 8, the difference between the "before" state and the "after" state is that the Queue 802 in the "after" state includes an entry that links to the sample #3. As discussed above, the act of committing the sample, in some examples, does not include copying the sample to a different buffer but, rather, includes reusing the same entry that links to the buffer in which sample #3 is held by moving it from the Remote Writer Queue 802 to the Queue 804.

Also, in the "after" state, the entry in the Remote Writer Queue 802 that was pointing to sample #3 in the "before" state is no longer required to be in the Remote Writer Queue 802. As also discussed above, the memory associated with the entry may not be returned to a FastBuffer but, rather, the pointers in the entries of the Remote Writer Queue 802 and of the Queue 804 may be manipulated so that the entry pointing to sample #3 becomes associated with the Queue 804 and disassociated with the Remote Writer Queue 802.

Figure 9B:
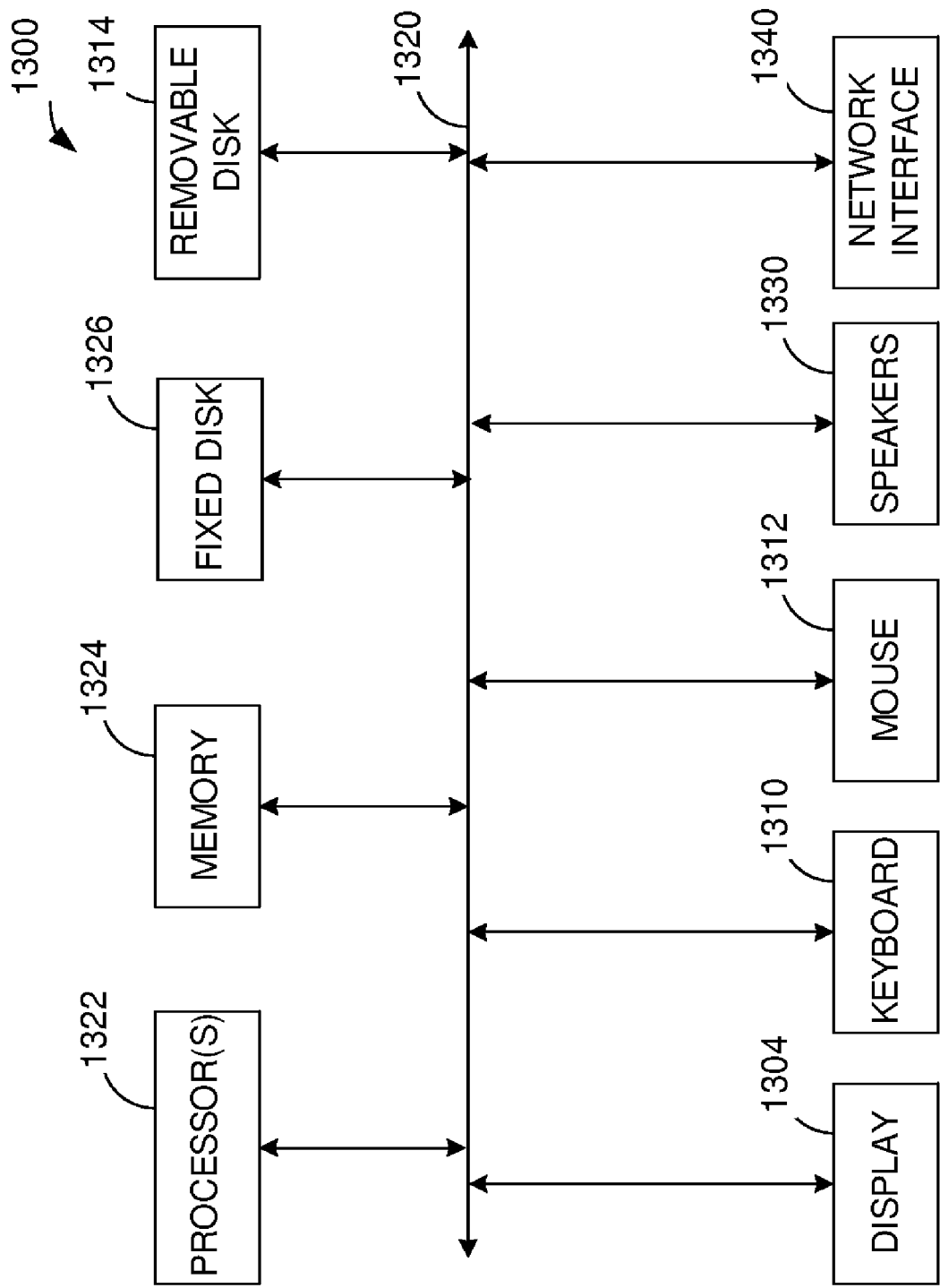

FIGS. 9A-B illustrate a computer system, which is suitable for implementing the embodiments of the present invention. FIGS. 9A and 9B illustrate a computer system 1300, which is suitable for implementing embodiments of the present invention. FIG. 9A shows one possible physical form of the computer system. Of course, the computer system may have many physical forms ranging from an integrated circuit, a printed circuit board, and a small handheld device up to a huge super computer. Computer system 1300 includes a monitor 1302, a display 1304, a housing 1306, a disk drive 1308, a keyboard 1310, and a mouse 1312. Disk 1314 is a computer-readable medium used to transfer data to and from computer system 1300.

FIG. 9B is an example of a block diagram for computer system 1300. Attached to system bus 1320 is a wide variety of subsystems. Processor(s) 1322 (also referred to as central processing units, or CPUs) are coupled to storage devices, including memory 1324. Memory 1324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1326 is also coupled bi-directionally to CPU 1322; it provides additional data storage capacity and may also include any of the computer-readable media described below. Fixed disk 1326 may be used to store programs, data, and the like and is typically a secondary storage medium (such as a hard disk) that is slower than primary storage. It will be appreciated that the information retained within fixed disk 1326 may, in appropriate cases, be incorporated in standard fashion as virtual memory in memory 1324. Removable disk 1314 may take the form of any of the computer-readable media described below.

CPU 1322 is also coupled to a variety of input/output devices, such as display 1304, keyboard 1310, mouse 1312, and speakers 1330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1322 optionally may be coupled to another computer or telecommunications network using network interface 1340. With such a network interface, it is contemplated that the CPU might receive information from the network, or might output information to the network in the course of performing the above-described method steps. Furthermore, method embodiments of the present invention may execute solely upon CPU 1322 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

In summary, by pre-allocating one or more pools of memory for the real-time middleware and then allowing the execution threads to "borrow" and "return" blocks of the memory to the pool, timeliness and predictability of data delivery in the real-time middleware can be more adequately ensured. In addition, the characteristics of the one or more pools of memory may be configurable by the user application, including a growth policy for the pool of memory. Furthermore, by employing layers of abstraction in the use of the pools of memory, configuration of the pools may be quite sophisticated, while shielding the user application from having deal with much of the complexity of the configuration (e.g., setting configuration parameters). The pre-allocated memory pools of fixed size buffers are used for implementing a fast, low-latency sample management mechanism in the outgoing data path for a Data Writer, and the incoming data path for a Data Reader.

What is claimed is:

1. A method comprising:
   operating real-time middleware associated with at least one node of a data distribution system to communicate data samples with middleware on the same or on other nodes, where each node is a separate computer, the middleware of the nodes operating using a publish-subscribe communication model to provide a publish-subscribe interface for distributing data samples among a plurality of user applications, each user application executing in a separate address space on the same or on other nodes, but having access to a global data space to publish and subscribe the data samples, wherein the data samples in the global data space are accessible to each user application via the middleware of the node, the method further comprising, by the real-time middleware associated with one of the at least one node of the data distribution system:

allocating, to the middleware associated with that one node, at least one pool of a plurality of fixed block size units of memory of the node;

based on loan requests for dynamic memory elements on behalf of a user application executing on that one node for storing published or subscribed data samples, providing an indication to the user application of at least one of the allocated fixed block size units to be lent on behalf of the user application; and maintaining a list of which allocated fixed block size units are being lent from the pool on behalf of the user application on that one node, including maintaining the list based on return requests relative to fixed block size units of the at least one pool for stored published or subscribed data samples for which a borrowing application is finished using the lent fixed block size units of the at least one pool;

wherein the allocating step is executed previous to the loan requests; and substantially all of the dynamic memory elements of the real-time middleware associated with that one node are provided from the at least one pool of allocated fixed block size units based on the loan requests from the user application on that one node for storing published or subscribed data samples.

2. The method of claim 1, wherein:

the user application accesses the middleware using an application program interface to provide a memory configuration specification to the middleware; and memory management for the at least one pool of fixed block size units is specified by the middleware in a manner that is based on the memory configuration specification provided to the middleware by the application program interface but that is not visible to the user application.

3. The method of claim 2, wherein:

the manner in which the middleware specifies the memory management for the at least one pool of fixed block size includes providing a specification of at least fixed block size and number of units.

4. The method of claim 3, wherein:

the specification further includes a specification relative to a growth policy for the at least one pool of fixed block size units of memory.

5. The method of claim 2, wherein:

the manner in which the middleware specifies the memory management for the at least one pool of fixed block size units includes receiving a memory management specification from the user application defining memory management functionality; and specifying the memory management by the middleware in the manner that is not visible to the user application includes providing a memory management that is parametrically defined within the middleware based on the memory management specification received from the user application.

6. The method of claim 5, wherein:

the middleware includes a plurality of hierarchically organized layers; and each parametric definition of the memory management specification is executed within a particular layer such that a memory management specification resulting therefrom is not visible in layers above that particular layer.

7. The method of claim 6, wherein:

the middleware initially interoperates with an operating system of that one node to allocate a pool of the fixed block size units of memory.

8. The method of claim 7, wherein:

the allocating step is repeated as appropriate based on a growth policy.

9. The method of claim 1, wherein:

the allocating step is repeated as appropriate based on a growth policy.

10. The method of claim 9, wherein:

the growth policy specifies a number of additional fixed block size units to allocate for the at least one pool, upon occurrence of a predetermined condition.

11. The method of claim 10, wherein:

the predetermined condition includes an amount of fixed block size units available for lending reaching a particular threshold.

12. The method of claim 11, wherein:

the particular threshold is zero.

13. A computing system executing the method set forth in claim 1.

14. A method, comprising:

communicating data samples by real-time middleware associated with at least one node of a data distribution system to communicate the data samples with middleware on the same or other nodes, where each node is a separate computer, the middleware of the nodes operating using publish-subscribe communication model to provide a publish-subscribe interface for the data samples among a plurality of user applications, each user application executing in a separate address space on the same or on other nodes, but having access to a global data space to publish and subscribe the data samples, wherein the data samples in the global data space are accessible to each user application via the middleware of the computer, the method further comprising, by the real-time middleware associated with one of the at least one node of the data distribution system:

storing the data samples in memory of that one node in fixed block size units;

maintaining a data sample list, of every data sample for that one node, in memory of that one node in fixed block size units, each entry in the list corresponding to a separate one of the data samples; and maintaining an index data structure including a plurality of instance lists, in memory of that one node in fixed block size units, each instance list corresponding to a separate data-object instance within that one node and each entry of each instance list corresponding to a data sample for the data-object instance to which that instance list corresponds;

wherein the memory of fixed block size units is borrowed and returned, as appropriate, to at least one memory buffer pool associated with that one node.

15. The method of claim 14, wherein:
a user application executing in the at least one node is a producer or consumer of the data samples; and
wherein the user application accesses the middleware using an application program interface to provide a memory configuration specification to the middleware; and
memory management for at least one pool of the fixed block size units is specified by the middleware in a manner that is based on the memory configuration specification provided to the middleware by the application program but that is not visible to the user application.

16. The method of claim 15, wherein:
the manner in which the middleware specifies the memory management for the at least one pool of fixed block size includes specifying at least fixed block size and number of units.

17. The method of claim 16, wherein:
the manner in which the middleware specifies the memory management for the at least one pool of fixed block size further includes a specifying growth policy for the at least one pool of fixed block size units of memory.

18. The method of claim 17, wherein:
the growth policy specifies a number of additional fixed block size units to allocate for the at least one pool, upon occurrence of a predetermined condition.

19. The method of claim 18, wherein:
the predetermined condition includes an amount of fixed block size units available for lending reaching a particular threshold.

20. The method of claim 19, wherein:
the particular threshold is zero.

21. The method of claim 14, wherein that one node is a consumer node; and
the method further comprises
within that one node, maintaining a staging area of fixed block size units for each remote writer that is providing data samples to that one node;
based on a determination that a data sample is to be committed to that one node,
operating on the data sample list such that an entry in the data sample list corresponds to the to-be committed data sample; and
operating on the instance list corresponding to the data-object instance with which the to-be committed data sample is to be associated, to associate the to-be committed data sample with that data-object instance.

22. The method of claim 21, further comprising: for a particular data sample, determining whether the particular data sample is to be committed to that one node.

23. The method of claim 22, wherein: determining whether the particular data sample is to be committed to that one node includes determining that data samples sequentially prior to the particular data sample have been received by that one node.

24. The method of claim 22, wherein: determining whether the particular data sample is to be committed to that one node includes determining that the sample is one of a plurality of samples, all of which are coherently available in the staging area.

25. The method of claim 21, wherein:
operating on the data sample list such that an entry in the data sample list corresponds to the to-be committed data sample, includes associating a fixed block size unit, holding the to-be committed data sample, with the data sample list.

26. The method of claim 25, wherein:
associating the fixed block size unit, holding the data sample, with the data sample list includes
modifying an entry in the staging area, pointing to the fixed block size unit holding the data sample, to be an entry of the data sample list.

27. The method of claim 26, further comprising:
creating an entry in the instance list to be associated with the entry modified from the staging area to be associated with the data sample list.

28. The method of claim 21, wherein:
operating on the instance list corresponding to the data-object instance with which the to-be committed data sample is to be associated, to associate the to-be committed data sample with that data-object instance, includes associating a fixed block size unit, holding the to-be committed data sample, with the instance list corresponding to the data-object instance with which the to-be committed data sample is to be associated.

29. The method of claim 28, wherein:
associating the fixed block size unit, holding the data sample, with the instance list corresponding to the data-object instance with which the data sample is to be associated includes
modifying an entry in the staging area, pointing to the fixed block size unit holding the data sample, to be an entry of the instance list corresponding to the data object instance with which the data sample is to be associated.

30. The method of claim 14, wherein:
each entry of each instance list corresponding to a data sample for the data-object instance to which that instance list corresponds includes that entry indicating the entry in the data sample list that holds that data sample.

31. The method of claim 14, wherein:
each entry in the instance list has a corresponding entry in the data sample list, such that that entry in the instance list and that entry in the data sample list point to the same data sample.

32. The method of claim 31, wherein:
that entry in the instance list and that entry in the data sample list are a single entry that is present in both the instance list and the data sample list.

33. A computing system executing the method as set forth in claim 14.

34. A method of generating real-time middleware code to be associated with at least one node of a data distribution system, the method comprising:
generating code to operate the real-time middleware associated with the at least one node of the data distribution system to communicate data samples with middleware on the same node or on other nodes, where each node is a separate computer, the middleware of the nodes operating using publish-subscribe communication model to provide a publish-subscribe interface for the data samples among a plurality of user applications, each user application executing in a separate address space on the same or on other nodes, but having access to a global data space to publish and subscribe the data samples, wherein the data samples in the global data space are accessible to each user application via the middleware of the computer,
generating code to cause the real-time middle ware associated with a first node to allocate at least one pool of a plurality of fixed block size units of memory of the node;

generating code to cause the first node to, based on loan requests for dynamic memory elements on behalf of a user application executing on the first node for storing published or subscribed data samples, providing an indication to the user application of at least one of the allocated fixed block size units to be lent on behalf of the user application; and generating code to cause the first node to maintain a list of which allocated fixed block size units are being lent from the at least one pool on behalf of the user application on the first node, including maintaining the list based on return requests relative to fixed block size units of the pool for stored published or subscribed data samples for which a borrowing application is finished using the lent fixed block size units of the at least one pool;

wherein the code causes the first node to allocate the at least one pool of a plurality of fixed block size units of memory of the node previous to the loan requests; and substantially all of the dynamic memory elements of the real-time middleware associated with the first node are caused to be provided from the at least one pool of allocated fixed block size units based on the loan requests from the user application on the first node for storing published or subscribed data samples; wherein the code is not specific to a particular memory management scheme and the method further comprises causing the code to be executed on a second node without modifying the code.

35. A non-transitory computer readable medium having a computer program tangibly embodied thereon, the computer program configured to cause a computing system to execute a method, comprising:

operating real-time middleware associated with at least one node of a data distribution system to communicate data samples with middleware of the same node or other nodes, where each node is a separate computer, the middleware of the nodes operating using publish-subscribe communication model to provide a publish-subscribe interface for the data samples among a plurality of user applications, each user application executing in a separate address space on the same node or in other nodes, but having access to a global data space to publish and subscribe the data samples, wherein the data samples in the global data space are accessible to each user application via the middleware of the computer, the method further comprising, by the real-time middleware associated with one of the at least one node of the data distribution system:

allocating, to the middleware associated with that one node, at least one pool of a plurality of fixed block size units of memory of the node;

based on loan requests loan requests for dynamic memory elements on behalf of a user application executing on the that one node for storing published or subscribed data samples, providing an indication to the user application of at least one of the allocated fixed block size units to be lent on behalf of the user application; and maintaining a list of which allocated fixed block size units are being lent from the at least one pool on behalf of the user application on that one node, including maintaining the list based on return requests relative to fixed block size units of the pool for stored published or subscribed data samples for which a borrowing application is finished using the lent fixed block size units of the at least one pool;

wherein the allocating step is executed previous to the loan requests; and substantially all of the dynamic memory elements of the real-time middleware associated with that one node are provided from the at least one pool of allocated fixed block size units based on the loan requests from the user application on that one node for storing published or subscribed data samples.

36. A tangible computer-readable medium having a computer program tangibly embodied thereon, the computer program configured to cause a computing system to execute a method comprising:

communicating data samples by real-time middleware associated with at least one node of a data distribution system to communicate the data samples with middleware of other nodes, where each node is a separate computer, the middleware of the nodes operating using publish-subscribe communication model to provide a publish-subscribe interface for the data samples among a plurality of user applications, each user application executing in a separate address space on the same or on other nodes, but having access to a global data space to publish and subscribe the data samples, wherein the data samples in the global data space are accessible to each user application via the middleware of the computer, the method further comprising, by the real-time middleware associated with one of the at least one node of the data distribution system:

storing the data samples in memory of that one node in fixed block size units;

maintaining a data sample list, of every data sample for that one node, in memory of that one node in fixed block size units, each entry in the list corresponding to a separate one of the data samples; and maintaining an index data structure including a plurality of instance lists, in memory of that one node in fixed block size units, each instance list corresponding to a separate data-object instance within that one node and each entry of each instance list corresponding to a data sample for the data-object instance to which that instance list corresponds;

wherein the memory of fixed block size units is borrowed and returned, as appropriate, to at least one memory buffer pool associated with that one node.

* * * * *